United States Patent [19]

Pagnac et al.

[11] Patent Number: 5,447,620

[45] Date of Patent: Sep. 5, 1995

[54] METHOD OF DEHYDRATING THE SOLVENT RESULTING FROM A PROCESS STEP OF DEWAXING HYDROCARBONS

[75] Inventors: Marie Pagnac; Roger Hournac, both of Paris, France

[73] Assignee: Compagnie Francaise D'Etudes Et De Construction Technip, Courbevoie, France

[21] Appl. No.: 81,649

[22] Filed: Jun. 22, 1993

[30] Foreign Application Priority Data

Jun. 23, 1992 [FR] France ................... 92 07655

[51] Int. Cl.$^6$ ............... C10G 73/10; C07C 51/44
[52] U.S. Cl. ...................... 208/33; 208/187; 208/321; 203/14; 203/17
[58] Field of Search ............ 208/33, 31, 32, 37, 208/306, 347, 25, 363, 28, 187, 321; 203/14, 17

[56] References Cited

U.S. PATENT DOCUMENTS

| | | | |
|---|---|---|---|
| 2,655,468 | 10/1953 | Greene | 202/42 |
| 4,033,855 | 7/1977 | Pütz | 208/33 |
| 4,088,564 | 5/1978 | Perry et al. | 208/33 |
| 4,088,565 | 5/1978 | Watts et al. | 208/33 |
| 4,186,059 | 1/1980 | Fleck | 208/33 |
| 4,354,921 | 10/1982 | Pitman et al. | 208/33 |
| 4,898,674 | 6/1990 | Pasternak et al. | 210/638 |

OTHER PUBLICATIONS

*Perry's Chemical Engineers' Handbook*, Perry et al., editors, Sixth Edition, pp. 13.5–13.15, McGraw-Hill (1984).

Le Petrole, Raffinage et Genie Chimique, pp. 641–649, P. Wuithier, 1965.

*Primary Examiner*—Asok Pal
*Assistant Examiner*—Bekir L. Yildirim
*Attorney, Agent, or Firm*—Steinberg, Raskin & Davidson

[57] ABSTRACT

A method of dehydrating a solvent originating from a hydrocarbon dewaxing operation, wherein a moist composite organic solvent, for example a moist MEK-/toluene mixture is dehydrated in a first distillation zone, the resulting first distillate is contacted with water to form two phases one of which, rich in organic solvent, is returned as a reflux to the first distillation zone whereas the other phase rich in water is distilled in a second distillation zone, and the head product and one portion of the bottom product of the second distillation zone are returned to the zone of contact between the first distillate and water, the invention being applicable to the dewaxing of lubricating oils.

9 Claims, 2 Drawing Sheets

METHOD OF DEHYDRATING THE SOLVENT RESULTING FROM A PROCESS STEP OF DEWAXING HYDROCARBONS

BACKGROUND OF THE INVENTION

The present invention relates to a method of dewaxing oils of hydrocarbons with a solvent and in particular a method permitting the dehydration at least in part of the recovered solvent. According to an embodiment, the method allows the adjustment of the solvent/antisolvent ratio and in particular the toluene/methylene/ketone (MEX) ratio.

The bases of distillates for the production of lubricating oils of hydrocarbons recovered during the distillation of petroleum under atmospheric pressure and under vacuum require various treatments adapted to make them comply with the specifications. One of these treatments is the paraffin extraction or dewaxing the purpose of which is to remove the hydrocarbons with a relatively high melting point in particular the paraffins with a linear chain which prevent the lubricating oils from remaining fluid enough at low temperatures. This treatment usually follows a refining making for example use of furfurol as a solvent.

The dewaxing is a well known operation which makes use generally at low temperature of a solvent or a mixture of such solvents that they are dissolving the hydrocarbons with a low melting point whereas the hydrocarbons with a high melting point are precipitating (paraffins) and may be retained on a filter.

Most frequently is used a mixture of solvents, for example a mixture of a good solvent for paraffin such as benzene or toluene hereinafter referred to as "solvent" and of a bad solvent for paraffin such as a ketone having from 3 to 6 carbon atoms, for example the methylethylketone (MEX) of the methylisobutylketone (MIBK) hereinafter referred to as "antisolvent". Here is preferred a mixture of toluene and of (MEX). The mixture of solvent and antisolvent will globally be referred to as "solvent mixture".

For a detailed description of the dewaxing operation, one could refer to the literature and to the patents and for example to the work of P. Wuithier, "Le Pétrole, Raffinage et Génie Chimique", (1965), pages 641–649 and to the U.S. Pat. Nos. 4,088,565 and 4,354,921.

One generally operates at low temperature, for example towards −20° to −30° C. and the filtration is usually carried out on rotary vacuum filters, which filter should be periodically cleaned with a solvent or a dry solvent mixture. The recovered solvent mixture is then separated from the oil in any suitable manner, for example by distillation.

Thus the separation of the oils and of the paraffins is obtained by a mechanical effect of filtration of low temperature combined with a chemical effort of dissolution in a solvent mixture the optimum composition of which varies in accordance with the batch.

This unit exhibits the other particular feature of having to treat different batch types originating from different cuts of distillates from a vacuum column, in an alternating manner and this throughout the whole year.

The required amounts of solvent mixture are very great since they vary between 200 and 400% by volume of the batch to be treated.

The solvent mixture is therefore recovered after separation of the oils and of the paraffins in different recovering sections with heat supply and then recycled to the filtration.

The solvent mixture is of a polar nature in view of the presence of the antisolvent which has a hydrophilous nature and has a tendency to fix the water it meets with. This water originates in particular from the batch and from the stripping steam used for recovering the last traces of the solvent mixture in the products.

Taking into account the polar nature of the solvent mixture, its direct complete drying is presently not practiced industrially. It therefore remains a problem which has not been solved in the industry in an economically satisfactory manner which is the one consisting in a fine separation between water and solvent mixture. Another problem which has not been solved in a satisfactory manner is the following:

For each batch type of a dewaxing unit, there are corresponding antisolvent/solvent, for example (MEK) toluene proportions. The dewaxing unit undergoes a frequency batch change (up to twice or three times a week for example) and the operator requires some time before obtaining the good composition of the mixture of solvent and of antisolvent in the whole unit for the next batch, while taking in particular into account the substantial residence time of this unit.

This exhibits the inconvenience of unbalancing the unit, of not letting same operating in an optimum way and of momentarily impairing the oil output yields.

By way of example, the treatment of a "bright stock" is currently using a MEK/toluene weight ratio of 0.7:1 to 1:1 whereas the treatment of light oils currently uses ratios of 1.1:1 to 2.3:1.

It is therefore important to be able to readily produce distinct supplies of solvent mixtures with the different compositions in order to be able to make available through simple mixing of streams issuing from these supplies, a whole range of compositions adapted to the variations of the treated batches.

This problem is referred to the U.S. Pat. No. 4,898,674 but the proposed solution (use of pervaporation membranes) remains industrially applicable with difficulties.

OBJECTS AND SUMMARY OF THE INVENTION

A first object of the invention is therefore to provide a simple and economical method of at least partial drying of the recovered moist solvent/antisolvent mixture.

Another object is to produce from a recovered moist solvent/antisolvent mixture, adjustable mixtures wherein the solvent/antisolvent ratio differs from that of the treated solvent/antisolvent mixture.

Further objects will become obvious to those skilled in the art when reading the following description.

According to the invention, one carries out the following operating steps:

a) One provides a moist solvent mixture (Mo) of solvent and of antisolvent as a feed batch into a first distillation zone; one recovers at the head a first distillate (M1) enriched in water and at the bottom a liquid solvent mixture (M2) of solvent and of antisolvent having become lean or impoverished in water with respect to the starting solvent mixture (Mo) and one discharges the solvent mixture (M2) which constitutes the at least partially dehydrated solvent mixture sought;

b) One contacts the first distillate (M1) with water of which at least one part is constituted by the aqueous stream (A1) defined later, the amount of water to contact the first distillate (M1) representing 0.05 to 10 times by weight the amount of the first distillate, and one lets the resulting mixture decant as a liquid phase in a decanting zone to obtain an upper liquid phase relatively lean or impoverished in water and a lower liquid phase relatively rich in water;

c) One feeds the upper liquid phase to a first distillation zone as a reflux;

d) One feeds the lower liquid phase into a second distillation zone and one recovers in said second distillation zone a head product relatively enriched in antisolvent, essentially constituting the said aqueous stream (A1) and a bottom product relatively lean or impoverished in antisolvent and essentially constituted by water, one draws off the bottom product and one returns the said aqueous stream (A1) to the step (b).

When the aqueous stream (A1) returned to the step (b) does not contain water enough to provide the amount of water required for that step, one adds additional water. This water may originate from an outside supply or very advantageously from a second aqueous stream (A2) obtained through partial recycling of the bottom product from the second distillation zone.

According to an alternative embodiment of the method adapted to supply at least two streams of the at least partially dehydrated solvent mixture and the solvent/antisolvent ratios of which are differing, one discharges from the first distillation zone at at least one intermediate point thereof located above the point of feeding the said zone with a moist mixture (Mo) of solvent and antisolvent, at least one liquid mixture (M3) relatively richer in antisolvent and poorer in solvent than the mixtures (Mo) and (M2). The mixture (M3) may also be poorer in water than the feed mixture (Mo) on condition that it should be drawn off at a relatively small distance above the point for feeding the mixture (Mo).

BRIEF DESCRIPTION OF THE DRAWINGS

FIG. 1 shows the basic embodiment of the invention without any intermediate tapping of the mixture (M3), FIG. 2 is a partial view of the equipment in the case where one proceeds with an intermediate tapping of the mixture (M3).

DETAILED DESCRIPTION OF THE INVENTION

Figure 1:
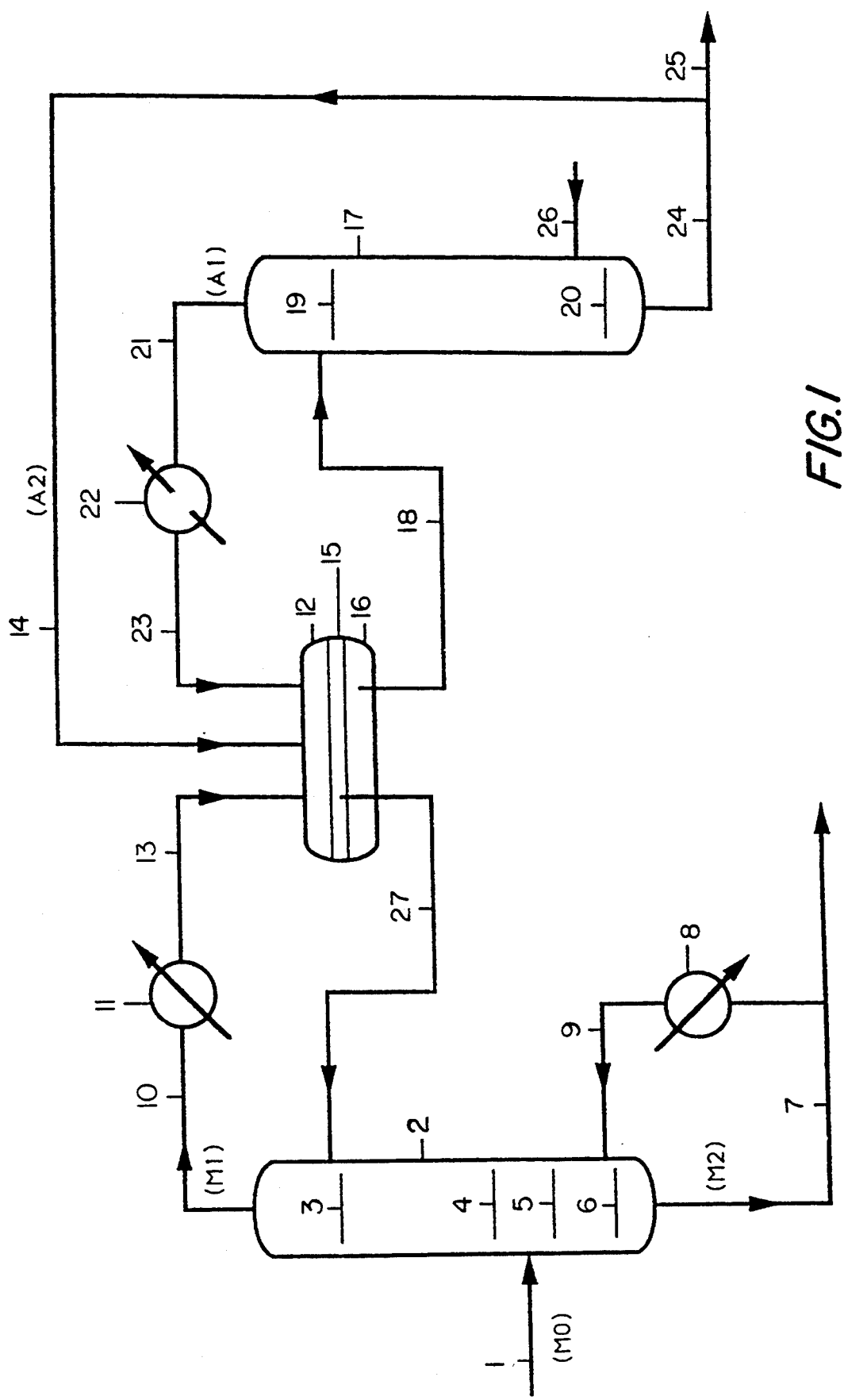
FIGS. 1 and 2 are illustrating the invention.

The starting mixture (Mo), for example a water MEK toluene mixture is introduced by the line 1 into the column 2 which is advantageously fitted with initial devices improving the liquid/stream contact.

On the figure are shown trays such as 3, 4, 5 and 6 but it is obvious that the number of fractionating stages is variable and that any other device known to the man skilled in the art could be used, such for example as a fitting with Raschig rings, Berl saddles or equivalent means.

At the bottom, one recovers the at least partially dehydrated mixture (M2) of solvent and of antisolvent (line 7).

The heating of the column may be performed by any conventional means. One has here shown a reboiler 8 and a return line for a stream which is partially or fully in vapor phase 9. At the head of the column, one recovers a stream of steam 10 (M1) which is liquified in the condenser 11 to feed the decanting flask 12 through the line 13.

When a sufficient amount of water supplied by the line 23 and possibly by the line 14 is present within the decanter 12, two liquid phases are separating from each other:

an upper phase 15 lean or impoverished in water and rich in solvent and antisolvent; the (solvent/antisolvent) ratio R of this upper phase however is smaller than that of the feed (line 1) whereas its water content is greater than that of the feed.

a lower phase 16 rich in water and which carries along a substantial proportion of antisolvent and a very small proportion of solvent. This latter phase is feeding a second distillation column 17 through the medium of the line 18. This column may like the column 2 be fitted with contact devices, for example trays such as 19 and 20. The head product (line 21) forms the stream (A1); it is condensed in a condenser 22 and reaches the decanter 12 through the line 23. The bottom product consisting essentially of water is drawn off through the line 24; one portion (line 25) is discharged and another portion forming the stream (A2) is carried back to the decanter 12 through the line 14.

Alternatively all the bottom product 24 is discharged through the line 25 and the additional water necessary to the decanter 12 is originating from another source.

Very advantageously steam (line 26) supplies at least one part of the heat required for the distillation which is performed within the column 17. It is however contemplated in the invention to use other modes of supplying heat to the said column. The stripping steam (26) may advantageously originate from the vaporization of one portion of the water drawn off through the line 24.

The line 27 permits the return of the liquid phase 15 towards the column 2 as a reflux.

On FIG. 2 is shown again one part of the diagram of FIG. 1 with the column 2 and the bottom drawing off of the mixture (M2). There is also shown a tank 32 for the mixture (M2) fed through the line 33. The line 34 allows to immediately draw off the solvent mixture (M2) for other uses, in particular for feeding a dewaxing unit.

There is moreover seen a drawing off (line 28) of the solvent mixture (M3) which allows either to feed the tank 29 through the line 30 or to recycle this mixture through the line 31 directly to the dewaxing unit.

Figure 2:
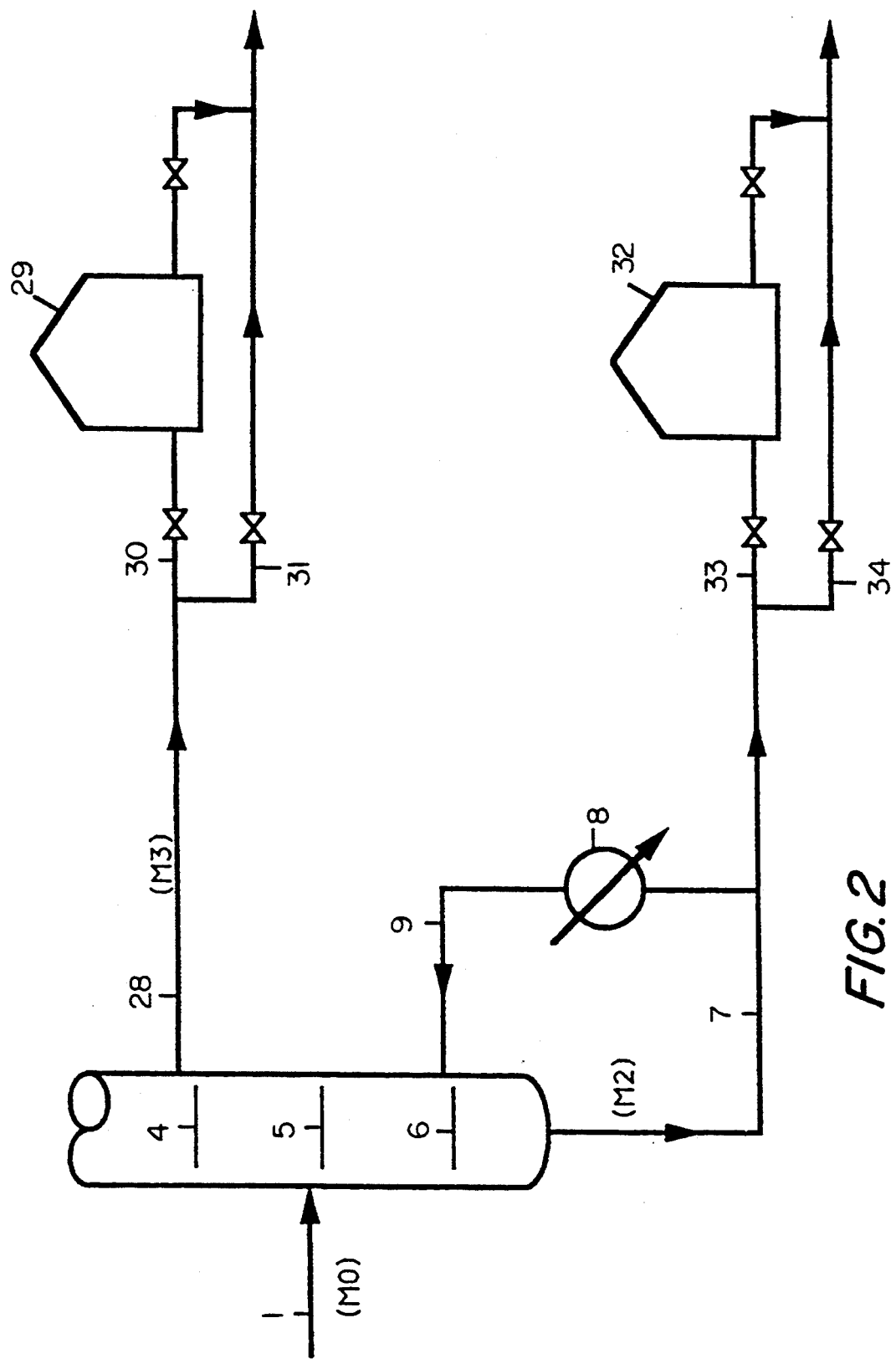

It will be appreciated that with the diagram of FIG. 2, the (solvent/antisolvent) ratio R of the mixture (M2) (line 7 and tank 32) is greater than that of the feed (Mo) (line 1). On the contrary the ratio R of the mixture (M3) (line 28 and tank 29) is smaller than those of both (Mo) and (M2). The water content of (M2) is also much lower than that of (Mo). The water content of (M3) is normally smaller than that of (Mo) at least when (M3) is drawn off at a small distance above the feed (Mo). Even though at a greater height the water proportion of (M3) is equal to or even somewhat exceeds that of (Mo), this would be without any major inconvenience to the extent where in a subsequent operation, a mixture of (M3) and (M2) would be used such that the overall water content be smaller than that of (Mo).

The flow (M3) may represent for example from 0 to 50% (by volume) of the flow (Mo), the flow (M2) then representing about 100% to 50% of the flow (Mo). These (volume) proportions preferably are 25% to 40% and about 75% to 60%, respectively. All of the streams (M2) and (M3) may slightly differ from 100% with respect to (Mo) owing to their lower water content.

It is obvious that various modifications within the ability of the man skilled in the art may be made in these diagrams. By way of example instead of causing the pipelines 13, 14 and 23 to lead separately to the decanter 12, it is possible to provide a mixture in line of two or three streams of these lines. One at least of the streams 13 and 23 may still be in a vapor phase whereas the stream 14 is in a liquid phase. A passage into a single condenser may also be subsequent to the mixing of the vapor streams 10 and 21; in this case, one of the condensers 11 or 22 is useless.

Both distillation columns may be operated at the same pressure or at different pressures. It is preferably to operate at atmospheric pressure for grounds of savings but some advantages may result from an operation under subatmospheric or superatmospheric pressure, for example between 0.5 and 5 bars of absolute pressure.

The operating temperatures are of course bound to the choice of the pressure and to that of the solvent/antisolvent pair. By operating for example under atmospheric pressure with the MEK/toluene mixture, the condensers 11 and 22 may be cooled without any difficulty with water or with air at least in temperature climates.

An important variable of the method is the selection of the amount of water fed to the decanting or settling drum 12 or directly to the line 10 or 13 for meeting there with the mixture (M1). This water is in the example chosen issuing from the line 23 for a minor part and from the line 14 for the major part; at the whole, this amount of water would represent 0.05 to 10 times, preferably 0.05 to 2 times or even better 0.1 to 0.5 times by weight the amount of distillate (line 10 or 13) of the column 2.

Since this water may flow in a closed circuit to a large extent, except for the amount extracted by the line 25 and that supplied by the distillate of the column 2, it is not compulsory to make additional supplies, except with a view to compensate for the losses.

The moist solvent mixture (Mo) which is feeding the first distillation zone may contain for example from 0.5 to 4% by weight of water, from 30% to 60% by weight of solvent and from 35% to 70% by weight of antisolvent, the whole amount representing 100%.

If it is necessary to add some solvent or antisolvent into the equipment, this addition may be performed at any adequate place of this equipment.

The following example illustrates a non-limiting embodiment for operating the invention.

The column (2) is fed by the line (1) by means of 42,416 kg/h of a mixture of 2.1% by water, 58.7% of MEK and 39.2% of toluene (all the percentages of the example being expressed by weight). 19,304 kg/h of a mixture of 13.2% of water, 77.6% of MEK and 9.2% of toluene are collected at the head, the said mixture being condensed (at 11) and contacted in the drum (12) with 2,502 kg/h of a substantially pure stream of water (14) and 916 kg/h of an aqueous flow (23) consisting of 10.3% of water, 89.5% of MEK and 0.2% of toluene. From the drum (12) are drawn off an upper phase rich in MEK (18,464 kg/h of a mixture of water, MEK and toluene) which is returned to the column 2 and a lower phase rich in water (4,261 kg/h of a mixture of water, MEK and traces of toluene) which is carried to the column 17, the stream inserted through the line 26 would strip the MEK and the traces of toluene, discharged through the line 21. At the bottom and through the line 25 are collected 4,032 kg/h of water containing 0.05% of MEK and practically not toluene.

The bottom product of the column 2, drawn off from the process, represents 41,599 kg/h of a mixture of 60% of MEK, 39.9% of toluene and 0.1% of water. This mixture may be used as a solvent mixture for a subsequent dewaxing operation.

The whole plant is operating at a pressure substantially equal to the atmospheric pressure.

What is claimed is:

1. A method for at least partially dehydrating a moist solvent mixture recovered from a dewaxing process, wherein the recovered moist solvent mixture includes toluene, methyl ethyl ketone and water, comprising the steps of:
   a) supplying an initial moist solvent mixture of toluene, methyl ethyl ketone and water as a feed charge to a first distillation zone having a head portion and a bottom portion, collecting a first distillate enriched in water at the head portion of said first distillation zone, collecting a liquid solvent mixture of toluene and methyl ethyl ketone, impoverished in water with respect to the initial solvent mixture, at the bottom portion of said first distillation zone, and discharging the liquid solvent mixture which thus constitutes a first at least partially dehydrated solvent mixture;
   b) contacting the first distillate with an amount of water representing from about 0.05 to about 10 times by weight the amount of the first distillate, and decanting the resulting mixture in liquid phase in a decanting zone to obtain an upper liquid phase relatively lean in water and a lower liquid phase relatively rich in water;
   c) conveying the upper liquid phase from the decanting zone as a reflux to said first distillation zone;
   d) feeding the lower liquid phase from the decanting zone into a second distillation zone, recovering a head product relatively enriched in methyl ethyl ketone and containing at least some water in said second distillation zone, and recovering a bottom product in said second distillation zone, the bottom product being relatively impoverished in methyl ethyl ketone and consisting essentially of water, drawing off the head product from said second distillation zone and directing the drawn-off head product into contact with the first distillate such that the head product drawn off from said second distillation zone provides at least a part of the amount of water contacting the first distillate; and
   e) discharging from said first distillation zone at least one additional at least partially dehydrated solvent mixture relatively richer in methyl ethyl ketone and leaner in toluene than said feed charge and said first discharged liquid solvent mixture, said discharging being effected at a distance above a point at which said feed charge is fed into said first distillation zone such that the water content of said at least one additional discharged liquid solvent mixture is lower than the water content of said feed charge.

2. A method according to claim 1, further comprising the step of feeding steam into the second distillation zone for stripping the solvent.

3. The method of claim 1, wherein one portion of the amount of water contacting the first distillate consists of one portion of the bottom product of said second distillation column.

4. The method of claim 1, wherein the amount of water contacted with the first distillate represents from about 0.1 to about 0.5 times by weight the amount of the first distillate.

5. The method of claim 1, wherein the moist solvent mixture supplied to the first distillation zone comprises by weight from about 0.5% to about 4% water, from about 30% to about 60% toluene and from about 35% to about 70% methyl ethyl ketone.

6. The method of claim 1, further comprising the step of admixing at least a portion of said first at least partially dehydrated solvent mixture discharged from the bottom of the first distillation zone with at least a portion of said at least one additional liquid solvent mixture to thereby constitute a stock of dewaxing solvent having a water content lower than the water content of said feed charge to said first distillation zone, the composition of said stock of dewaxing solvent being adaptable to the dewaxing of hydrocarbon charges of variable composition.

7. The method of claim 6, wherein the amounts of said at least one additional liquid solvent mixture and said first at least partially dehydrated solvent mixture to be admixed are about 25% to about 40% and about 75% to about 60% by volume of the amount of said feed charge to said first distillation zone, respectively.

8. A method for solvent dewaxing wax containing hydrocarbon charges of variable composition, wherein a wax containing hydrocarbon charge is contacted with a methyl ethyl ketone/toluene solvent mixture at dewaxing conditions, the wax then being separated from the methyl ethyl ketone/toluene/dewaxed oil mixture, and wherein a methyl ethyl ketone/toluene mixture is distilled from said methyl ethyl ketone/toluene/dewaxed oil mixture, said distilled methyl ethyl ketone/toluene mixture containing water and requiring subsequent dehydration for re-use, the method comprising the steps of:

a) supplying the water containing the methyl ethyl ketone/toluene mixture as a feed charge to a first distillation zone having a head portion and a bottom portion, recovering a first distillate enriched in water at the head portion of said first distillation zone, recovering a first liquid methyl ethyl ketone/toluene solvent mixture having a decreased water content with respect to the feed charge, at the bottom portion of said first distillation zone, and discharging the first liquid solvent mixture;

b) contacting the first distillate with an amount of water representing from about 0.05 to about 10 times by weight the amount of the first distillate, and settling the resulting mixture in a decanting zone to obtain an upper liquid phase relatively lean in water and a lower liquid phase relatively rich in water;

c) conveying the upper liquid phase from the decanting zone as a reflux to said first distillation zone;

d) feeding the lower liquid phase from the decanting zone into a second distillation zone, recovering a head product relatively enriched in methyl ethyl ketone and containing at least some water in said second distillation zone, and recovering a bottom product in said second distillation zone, the bottom product being relatively impoverished in methyl ethyl ketone and consisting essentially of water, drawing off the head product from said second distillation zone and directing the drawn-off head product into contact with the first distillate such that the head product drawn off from said second distillation zone provides at least a part of the amount of water contacting the first distillate;

e) discharging at least one additional liquid methyl ethyl ketone/toluene solvent mixture from said first distillation zone above a feeding point at which said feed charge is fed into said first distillation zone, f) admixing said first liquid solvent mixture discharged from the bottom of said first distillation zone with said at least one additional methyl ethyl ketone/toluene solvent mixture in such proportions that the resulting mixture has a water content lower than the water content of the water containing methyl ethyl ketone/toluene mixture supplied to said first distillation zone and a composition adapted for dewaxing a new wax containing hydrocarbon charge, and g) recycling said resulting mixture to contact the wax containing hydrocarbon charges with a methyl ethyl ketone/toluene solvent mixture.

9. The method of claim 8, wherein one portion of the amount of water contacting the first distillate consists of one portion of the bottom product of said second distillation zone.

* * * * *